(12) United States Patent
Elefritz, Jr. et al.

(10) Patent No.: US 7,569,148 B2
(45) Date of Patent: Aug. 4, 2009

(54) CONTINUOUS MEMBRANE FILTRATION AND SOLIDS REDUCTION

(75) Inventors: Robert A. Elefritz, Jr., Ormond Beach, FL (US); James Holland Scott, III, Salt Lake City, UT (US)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 11/843,817

(22) Filed: Aug. 23, 2007

(65) Prior Publication Data

US 2008/0047895 A1 Feb. 28, 2008

Related U.S. Application Data

(60) Provisional application No. 60/823,268, filed on Aug. 23, 2006.

(51) Int. Cl.
*C02F 3/00* (2006.01)
(52) U.S. Cl. .................. 210/607; 210/623; 210/768
(58) Field of Classification Search ............ 210/607, 210/609, 620–623, 767–768, 611, 754, 756, 210/757, 759, 916
See application file for complete search history.

(56) References Cited

U.S. PATENT DOCUMENTS

| | | | |
|---|---|---|---|
| 3,681,235 A | 8/1972 | Topol | |
| 3,938,434 A | 2/1976 | Cox | |
| 3,954,606 A | 5/1976 | Block et al. | |
| 3,959,126 A | 5/1976 | Millward | |
| 3,959,133 A | 5/1976 | Fulton | |
| 3,994,802 A | 11/1976 | Casey et al. | |
| 4,041,854 A | 8/1977 | Cox | |
| 4,056,465 A | 11/1977 | Spector | |
| 4,073,722 A | 2/1978 | Grutsch et al. | |
| 4,081,368 A | 3/1978 | Block et al. | |
| 4,087,361 A | 5/1978 | Block et al. | |
| 4,162,153 A | 7/1979 | Spector | |
| 4,173,531 A | 11/1979 | Matsch et al. | |
| 4,183,808 A | 1/1980 | Drnevich | |
| 4,193,866 A | 3/1980 | Slusarczuk et al. | |
| 4,200,524 A | 4/1980 | Levin | |

(Continued)

FOREIGN PATENT DOCUMENTS

EP 1659171 5/2006

(Continued)

OTHER PUBLICATIONS

Aqua-Aerobics.com: AquaMProcess, "AquaMB Process," http://www.aqua-aerobics.com/mpprocess.html, downloaded Mar. 31, 2004.*

(Continued)

*Primary Examiner*—Chester T Barry

(57) ABSTRACT

A method and system of treating wastewater that can provide operating flexibility is disclosed. The system is operated with a sequencing batch reactor, which is typically cycling to any of fill, react, settle, decant, and idle stages, to treat the wastewater. The system can further utilize a membrane filtration system to further treat water from the sequencing batch reactor and produce suitable water. A solids-reducing system can be connected to the sequencing batch reactor and reduce an amount of biodegraded solids by converting the character or distribution of microorganisms population in the biomass.

13 Claims, 4 Drawing Sheets

U.S. PATENT DOCUMENTS

| | | | |
|---|---|---|---|
| 4,240,210 A | 12/1980 | Huang | |
| 4,271,026 A | 6/1981 | Chen et al. | |
| 4,292,176 A | 9/1981 | Grutsch et al. | |
| 4,315,821 A | 2/1982 | Climenhage | |
| 4,411,203 A | 10/1983 | Lewis | |
| 4,460,470 A | 7/1984 | Reimann | |
| 4,488,967 A | 12/1984 | Block et al. | |
| 4,488,968 A | 12/1984 | Hong et al. | |
| 4,552,663 A | 11/1985 | Spector et al. | |
| 4,554,077 A | 11/1985 | Brown et al. | |
| 4,556,491 A | 12/1985 | Spector et al. | |
| 4,610,801 A | 9/1986 | Matthews et al. | |
| 4,647,287 A | 3/1987 | Audeh | |
| 4,650,585 A | 3/1987 | Hong et al. | |
| RE32,429 E | 6/1987 | Spector | |
| 4,711,727 A | 12/1987 | Matthews et al. | |
| 4,721,569 A | 1/1988 | Northrop | |
| 4,731,185 A | 3/1988 | Chen et al. | |
| 4,735,729 A | 4/1988 | Dietrich et al. | |
| 4,775,467 A | 10/1988 | Calltharp et al. | |
| 4,802,905 A | 2/1989 | Spector | |
| 4,812,225 A | 3/1989 | Corti et al. | |
| 4,812,234 A | 3/1989 | Perchthaler et al. | |
| 4,824,563 A | 4/1989 | Iwahori et al. | |
| 4,834,889 A | 5/1989 | Schleiffarth | |
| 4,874,519 A | 10/1989 | Williamson | |
| 4,919,815 A | 4/1990 | Copa et al. | |
| 4,968,360 A | 11/1990 | Hosemann et al. | |
| 4,981,579 A | 1/1991 | Paspek et al. | |
| 4,999,111 A | 3/1991 | Williamson | |
| 5,021,161 A | 6/1991 | Calltharp | |
| 5,021,166 A | 6/1991 | Torpey | |
| 5,024,707 A | 6/1991 | Rausch | |
| 5,028,326 A | 7/1991 | Littler et al. | |
| 5,057,220 A | 10/1991 | Harada et al. | |
| 5,075,015 A | 12/1991 | Kamke | |
| 5,087,378 A | 2/1992 | Kovacs | |
| 5,092,983 A | 3/1992 | Eppig et al. | |
| 5,098,572 A | 3/1992 | Faup et al. | |
| 5,100,561 A | 3/1992 | Wood et al. | |
| 5,128,040 A | 7/1992 | Molof et al. | |
| 5,160,043 A | 11/1992 | Kos | |
| 5,182,021 A | 1/1993 | Spector | |
| 5,183,576 A | 2/1993 | Wood et al. | |
| 5,192,442 A | 3/1993 | Piccirillo et al. | |
| 5,213,681 A | 5/1993 | Kos | |
| 5,275,733 A | 1/1994 | Burnham | |
| 5,288,405 A | 2/1994 | Lamb, III | |
| 5,296,147 A | 3/1994 | Koster et al. | |
| 5,302,288 A | 4/1994 | Meidl et al. | |
| 5,334,313 A | 8/1994 | Anderson | |
| 5,342,522 A | 8/1994 | Marsman et al. | |
| 5,355,594 A | 10/1994 | Hwang | |
| 5,356,537 A | 10/1994 | Thurmond et al. | |
| 5,417,861 A | 5/1995 | Burnham | |
| 5,480,559 A | 1/1996 | Smisson | |
| 5,500,044 A | 3/1996 | Meade et al. | |
| 5,514,277 A | 5/1996 | Khudenko | |
| 5,514,278 A | 5/1996 | Khudenko | |
| 5,543,051 A | 8/1996 | Harris | |
| 5,616,241 A | 4/1997 | Khudenko | |
| 5,650,069 A | 7/1997 | Hong et al. | |
| 5,669,969 A | 9/1997 | Meade et al. | |
| 5,736,047 A | 4/1998 | Ngo | |
| 5,798,043 A | 8/1998 | Khudenko | |
| 5,820,760 A | 10/1998 | Spector | |
| 5,846,424 A | 12/1998 | Khudenko | |
| 5,853,450 A | 12/1998 | Burnham et al. | |
| 5,919,367 A | 7/1999 | Khudenko | |
| 6,004,456 A | 12/1999 | Khudenko | |
| 6,015,496 A | 1/2000 | Khudenko | |
| 6,039,874 A | 3/2000 | Teran et al. | |
| 6,224,779 B1 | 5/2001 | Spector | |
| 6,379,545 B1* | 4/2002 | Perslow et al. | 210/605 |
| 6,383,387 B2* | 5/2002 | Hasegawa et al. | 210/609 |
| 6,383,389 B1 | 5/2002 | Pilgram et al. | |
| 6,517,723 B1 | 2/2003 | Daigger et al. | |
| 6,613,222 B2 | 9/2003 | Mikkelson et al. | |
| 6,660,163 B2 | 12/2003 | Miklos | |
| 6,685,834 B1 | 2/2004 | Murthy et al. | |
| 6,833,074 B2 | 12/2004 | Miklos | |
| 6,863,826 B2 | 3/2005 | Sheets | |
| 6,875,357 B1 | 4/2005 | Mikkelson et al. | |
| 6,884,354 B1 | 4/2005 | Calltharp | |
| 6,984,323 B2 | 1/2006 | Khudenko | |
| 7,014,763 B2 | 3/2006 | Johnson et al. | |
| 7,105,091 B2 | 9/2006 | Miklos | |
| 7,118,674 B2 | 10/2006 | Dimitriou et al. | |
| 7,147,778 B1 | 12/2006 | DiMassimo et al. | |
| 7,156,998 B2 | 1/2007 | Reid | |
| 7,179,370 B2 | 2/2007 | Dimitriou et al. | |
| 7,279,099 B2 | 10/2007 | Reimers et al. | |
| 7,329,344 B2 | 2/2008 | Jordan et al. | |
| 7,344,643 B2 | 3/2008 | Elefritz, Jr. et al. | |
| 7,476,322 B2 | 1/2009 | Dimitriou et al. | |
| 2002/0117444 A1* | 8/2002 | Mikkelson et al. | 210/605 |
| 2006/0000770 A1* | 1/2006 | Deleris et al. | 210/606 |
| 2006/0081534 A1 | 4/2006 | Dimitriou et al. | |
| 2007/0138070 A1 | 6/2007 | Dimitriou et al. | |

FOREIGN PATENT DOCUMENTS

| | | |
|---|---|---|
| FR | 2762834 | 11/1998 |
| JP | 56-065693 | 6/1981 |
| JP | 57-187097 | 11/1982 |
| JP | 02-040296 | 2/1990 |
| JP | 2005-279447 | 10/2005 |
| WO | 2005107929 | 11/2005 |

OTHER PUBLICATIONS

R.M. Ben Aim et al., "Membrane bioreactors for wastewater treatment and reuse: a success story," Water Science and Technology, 2002, vol. 47, No. 1, pp. 1-5.

"AquaMB Process—Multiple Barrier Membrane System," 2003, Aqua-Aerobic Systems, Inc., Rockford, IL.

N. Cicek, "Membrane Bioreactors in the Treatment of Wastewater Generated From Agricultural Industries and Activities," AIC 2002 Meeting, CSAE/SCGR Program, Saskatoon, Saskatchewan, Jul. 14-17, 2002.

D. Defour et al., "Field Experience With Different Systems for Biomass Accumulation in Anaerobic Reactor Technology," Wat. Sci. Tech.. 1994, vol. 30, No. 12, pp. 181-191.

K. Fitzgerald, "Membrane Bioreactors," Dec. 2005, pp. 1-11, TSG Technologies, Inc., Gainesville, FL.

W. Garrison et al., "Pilot-plant studies of waste activated sludge processing," Journal WPCF, Oct. 1978, pp. 2374-2387.

S. Ghosh et al., "The Acimet Process: An Innovative Approach to Biogasification of Municipal Sludge," pp. 759-769, Publication Date Unknown.

S. Ghosh et al., "Methane Production From Industrial Wastes by Two-Phase Anaerobic Digestion," Water Res., 1985, vol. 19, No. 9, pp. 1083-1088.

International Search Report and Written Opinion of International Application No. PCT/US2007/018668, dated Feb. 11, 2008.

S. Ghosh, "Pilot-Scale Demonstration of Two-Phase Anaerobic Digestion of Activated Sludge," Wat. Sci. Tech., 1991, vol. 23, Kyoto, pp. 1179-1188.

J. Gossett et al., "Anaerobic Digestion of Waste Activated Sludge," The British Library—The World's Knowledge, vol. EE6, Dec. 1982, pp. 1101-1120.

"ITT and the Cycle of Water—Wastewater Solutions," Case Study, ITT, Upper Saddle River, NJ, Publication Date Unknown.

I. Kang, "Characteristics of microfiltration membranes in a membrane coupled sequencing batch reactor system," Water Research, 37 (2003) 1192-1197.

B. Khudenko, "Development and Analysis of Equalization Basins,"Journal of Environmental Engineering, vol. 111, No. 6, Dec. 1985, pp. 907-922.

B. Khudenko et al., "Hydrodynamics of Fluidized Bed Reactors for Wastewater Treatment," The British Library—The World's Knowledge, pp. 1288-1336, Publication Date Unknown.

B. Khudenko, "Optimization of Automated Equalization Basin-Reactor Systems for Chemical Treatment of Wastewater," Wat. Sci. Tech., 1981, vol. 13, Munich, pp. 355-362.

J. Malina, Jr., "The Effect of Temperature on High-Rate Digestion of Activated Sludge," The British Library—The World's Knowledge, pp. 232-250, Publication Date Unknown.

D. Miklos et al., "Industrial Plant Uses New Zero Solids Discharge Technology," Case Study, Industrial Waterworld, 2003, PennWell Corporation.

J. Novak et al., "Biological Solids Reduction Using the Cannibal Process," Water Environment Research, Nov. 2007, vol. 79, No. 12, pp. 2380-2386.

"Omniflo SBR Proven Performance Under Demanding Conditions," Siemens Water Technologies Corp., Case Study, 2007.

B. Ranade et al., "Microbial Massacre," Environmental Protection, Jul.-Aug. 2004.

J. Sheridan et al., "Revoluntionary Technology Cuts Biosolids Production and Costs," Casebook, Pollution Engineering, May 2004.

M. Swinarski, "The development of waste water treatment systems in Gdansk in 1871-1998", European Water Management, 1999, vol. 2, No. 4, pp. 69-76.

R. Van Kempen et al., "Membrane Bioreactors for Large Scale Municipal Wastewater Treatment," Publication Date Unknown.

S. Yoon, "Important operational parameters of membrane bioreactor-sludge disintegration (MBR-SD) system for zero excess sludge production," Water Research, 37 (2003) 1921-1931.

* cited by examiner

CONTINUOUS MEMBRANE FILTRATION AND SOLIDS REDUCTION

CROSS-REFERENCE TO RELATED APPLICATIONS

This application claims the benefit of U.S. Provisional Application No. 60/823,268, filed Aug. 23, 2006, entitled COMBINATION OF A FIVE STAGE SEQUENCING BATCH REACTOR WITH CONTINUOUS MEMBRANE FILTRATION, the entire contents of which is incorporated herein by reference.

BACKGROUND OF THE INVENTION

1. Field of the Invention

The present invention relates to systems and processes of wastewater treatment and, in particular, to systems and methods of treating wastewater utilizing sequencing batch reactors with membrane filtration systems.

2. Description of the Related Art

Pilgram et al., in U.S. Pat. No. 6,383,389, which is incorporated herein by reference, teach a wastewater treatment system and method of controlling the treatment system. A control system can sequence and supervise treatment steps in a batch flow mode of operation or a continuous flow mode of operation.

Daigger et al., in U.S. Pat. No. 6,517,723, teach a method and apparatus for treating wastewater using membrane filters. The apparatus includes a bioreactor for containing a mixture of wastewater under treatment and activated sludge. The bioreactor is divided into a plurality of serially connected treatment zones. A membrane filter is downstream of an aerobic zone of the bioreactor.

Mikkelson et al., in U.S. Pat. Nos. 6,613,222 and 6,875,357, teach a process and apparatus for the treatment of wastewater. A three-phase cycle, including a mix fill phase, a react fill phase, and react discharge phase, is used. The need for separate basins for anaerobic and anoxic conditions, and a quiescent environment for solids/liquid separation as in conventional sequencing batch reactor systems is eliminated.

Johnson et al., in U.S. Pat. No. 7,014,763, teach multiple barrier biological treatment systems. In a sequencing batch reactor system, the activated sludge, biochemical reaction stages are separated from and independent of the clarification and sedimentation stages.

Dimitriou et al., in U.S. Pat. Nos. 7,118,674 and 7,179,370, disclose an energy-efficient biological treatment with membrane filtration apparatus and process. The biological treatment section is physically separated from the filtration section.

DiMassimo et al., in U.S. Pat. No. 7,147,778, disclose a method and system for nitrifying and denitrifying wastewater. The system has reactors that nitrify or denitrify wastewater and a membrane reactor that operates under aerobic conditions.

Reid, in U.S. Pat. No. 7,156,998, teaches a phased activated sludge system that incorporates batch treatment techniques in a flow-through process. The mixing and aeration systems are independent to facilitate the operation of the main reactor vessel in aerated and anoxic conditions.

SUMMARY OF THE INVENTION

One or more aspects of the invention involve embodiments of a wastewater treatment system comprising a source of wastewater, at least one sequencing batch reactor fluidly connected to the source of wastewater, a membrane filter system fluidly connectable to the sequencing batch reactor, and a solids reduction system comprising at least one biological reactor fluidly connectable to the sequencing batch reactor.

Other aspects of the invention can involve a method of treating wastewater comprising introducing wastewater to be treated into a biological reactor, aerating at least a portion of the wastewater to promote conversion of at least a portion of undesirable components in the wastewater into a first biomass in the biological reactor, allowing at least a portion of the first biomass to settle in the biological reactor thereby producing a solids-rich liquor and a solids-lean liquor, transferring at least a portion of the solids-lean liquor into a membrane filtration system, and transferring at least a portion of the solids-rich liquor into a biological solids reduction system.

Further aspects of the invention can involve a method of facilitating wastewater treatment comprising providing a membrane filtration system comprising a retentate liquor outlet, fluidly connecting the membrane filtration system downstream of a sequencing batch reactor system, fluidly connecting a retentate liquor outlet of the membrane filtration system to an inlet of the sequencing batch reactor system, and connecting a solids-reducing biological system to a sludge outlet of the sequencing batch reactor system.

Still further aspects of the invention can involve a wastewater treatment system comprising a first biological conversion system comprising a sequencing batch reactor fluidly connected to a membrane filtration unit, and a second biological conversion system fluidly connected to the first biological conversion system. The second biological conversion system can comprise a facultative biological reactor.

Other further aspects of the invention can involve a method of treating water comprising filling a basin of a sequencing batch reactor with water to be treated to form mixed liquor, aerating the mixed liquor in the basin to promote biological activity therein, allowing at least a portion of the solids in the mixed liquor to settle into a solids-rich sludge layer below a solids-lean water layer, decanting at least a portion of the solids-lean water, and contacting the decanted solids-lean water to a membrane filtration system.

In accordance with still further aspects, the invention can involve a method of treating water comprising filling a basin of a sequencing batch reactor with water to be treated to form mixed liquor, aerating the mixed liquor in the basin to promote biological activity therein, decanting from the basin a solids-lean water stream formed after allowing at least a portion of the solids to settle into a solids-rich sludge layer, transferring at least a portion of the solids-rich sludge into a bioreactor, and converting a microorganism population distribution of the solids-rich sludge into a facultative-organism dominant population distribution.

BRIEF DESCRIPTION OF THE DRAWINGS

The accompanying drawings are not intended to be drawn to scale. The identical or nearly identical component or feature that is illustrated in various figures is represented by a like numeral. For purposes of clarity, not every component may be labeled in every drawing, nor is every component of each embodiment of the invention shown where illustration is not necessary to allow those of ordinary skill in the art to understand the invention. In the drawings.

DETAILED DESCRIPTION OF THE INVENTION

Figure 1:
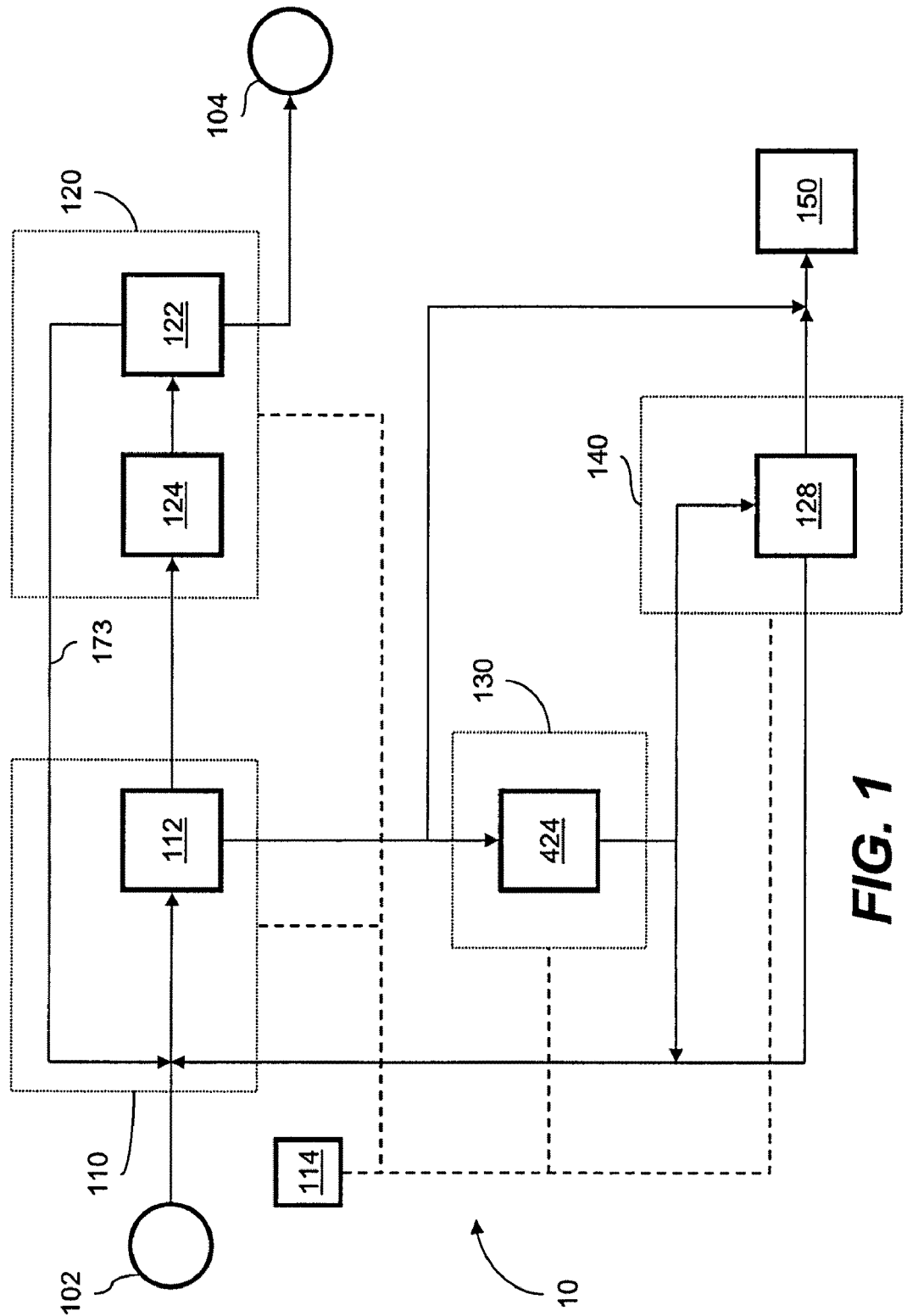
FIG. 1 is a block flow diagram illustrating a representative treatment system pertinent to one or more aspects of the invention.

This invention is directed to systems and methods of treating water to, for example, reduce oxygen demand, such as the biological oxygen demand (BOD), and render the water suitable for secondary uses or discharge to the environment. One or more aspects of the invention relate to wastewater treatment systems and methods of operation and facilitating thereof. The invention is not limited in its application to the details of construction and the arrangement of components, systems, or subsystems set forth herein, and is capable of being practiced or of being carried out in various ways. Typically, the water to be treated, such as wastewater or a wastewater stream, contains waste matter which, in some cases, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its BOD or other characteristic such as *Giardia* content to within acceptable limits.

Some aspects of the invention can involve biologically treating wastewater by promoting bacterial digestion of biodegradable material of at least a portion of at least one species in the wastewater. Further aspects of the invention can relate to effecting or at least facilitating separation of converted, digested biodegraded solid material from the entraining liquid. Still further aspects of the invention can relate to effecting or at least facilitating reducing an amount of solids from the wastewater.

As used herein, the terms "water" and "wastewater" refer to water to be treated such as streams or bodies of water from residential, commercial, or municipal, industrial, and agricultural sources, as well as mixtures thereof, that typically contain at least one undesirable species, or pollutant, comprised of biodegradable, inorganic or organic, materials which can be decomposed or converted by biological processes into environmentally benign or at least less objectionable compounds. The water to be treated can also contain biological solids, inert materials, organic compounds including recalcitrant or a class of compounds that are difficult to biodegrade relative to other organic compounds as well as constituents from ancillary treatment operations such as, but not limited to, nitrosamines.

A "solids-lean" liquor is typically water having less suspended solids relative to a starting mixed liquor after one or more settling or separation operations. Conversely, a "solids-rich" liquor, which is also referred to herein as "sludge," is typically water having a higher solids concentration relative to a starting mixed liquor after one or more settling or separation operations. For example, a mixed liquor having suspended solids can be allowed to promote settling of at least a portion of the solids suspended therein; the resultant water body, as a consequence of artificially induced or natural gravitational forces will typically have a lower water layer and an upper water layer, wherein the lower sludge layer has a higher concentration of solids, relative to the starting mixed liquor and to the upper, solids-lean water layer. Further, the solids-lean water layer will typically have a lower concentration of solids suspended therein relative to the starting mixed liquor.

The inventive systems can comprise one or more biologically-based unit operations. The systems and techniques of the invention can be effected as, or at least as a portion, of decontamination or treatment systems that typically include one or more of pre-treatment, primary treatment, secondary treatment, and post-treatment or polishing operations. Further, the treatment facilities that can employ one or more aspects of the invention can include at least one of the pre-treatment, primary treatment, secondary treatment, and post-treatment or polishing operations.

Pretreatment systems and operations may remove grit, sand, and gravel. Primary treatment operations or systems can involve at least partial equalization, neutralization, and/or removal of large insoluble material of the water to be treated such as, but not limited to fats, oils, and grease. The pretreatment and primary treatment operations may be combined to remove such materials as well as settlable solids and floating bodies, and insoluble objects such as rags and sticks. Primary clarifiers may be utilized to separate larger solids.

Secondary treatment unit operations or systems can involve biological digestion or biological treatment such as those that typically employ a biomass with bacteria to at least partially digest or convert biodegradable material such as, but not limited to, sugar, fat, organic molecules, and compounds that create an oxygen demand. Indeed some advantageous aspects of the invention can utilize biological processes and systems to remove, convert or neutralize at least a portion of organic material in the water to be treated.

Some embodiments of the treatment systems of the invention can comprise a first biological conversion train or system comprising a sequencing biological reactor fluidly and a second biological conversion train or system fluidly connected to the first biological conversion system. The first biological conversion system can further comprise or be connected to one or more membrane filtration units. The second biological conversion system can comprise one or more unit operations that reduce an amount of solids with one or more facultative biological reactors.

One or more embodiments pertinent to some aspects of the invention can involve a method of treating wastewater comprising one or more acts or steps of introducing wastewater to be treated into a biological reactor, aerating at least a portion of the wastewater to promote conversion of at least a portion of undesirable components in the wastewater into a first biomass in the biological reactor, allowing at least a portion of the first biomass to settle in the biological reactor thereby producing a solids-rich liquor and a solids-lean liquor. At least a portion of the solids-lean liquor can be transferred into a membrane filtration system. Optionally, at least a portion of the solids-rich liquor or sludge can be transferred into a biological solids-reducing system.

One or more embodiments pertinent to other aspects of the invention can involve a wastewater treatment system comprising a source of wastewater and at least one bioreactor, such as sequencing batch reactors, fluidly connected to the source of wastewater. The treatment system can further comprise at least one membrane filtration system fluidly connectable to at least one of the sequencing batch reactors. In some cases, the treatment system can further comprise a solids reduction system with at least one biological reactor fluidly connectable to the sequencing batch reactor. The treatment system may further comprise a controller operatively coupled to control the sequencing batch reactor in, for example, a settle or decant stage.

In still further embodiments of the invention, the method and techniques of the invention can comprise providing a membrane filtration system comprising a retentate liquor outlet and, in some cases, fluidly connecting the membrane filtration system downstream of a sequencing batch reactor system. The retentate liquor outlet of the membrane filtration system can be fluidly connected to an inlet of the sequencing batch reactor system. A solids-reducing biological system can optionally be connected to a sludge outlet of the sequencing batch reactor system. A solids-reducing system can also be connected to one or more of the biological reactors to at least partially reduce an overall amount of solids recovered or removed from the water to be treated thereby reducing a burden on an amount of solids to be disposed or discharged to a landfill.

Still further aspects of the invention can be considered as biologically treating nitrogen-based compounds, separating a liquid product, and/or separating a solids-rich product from the water to be treated. Other aspects of the invention can be considered as decoupling operational interaction or dependencies between the biologically-based treatment systems and processes from the solids and liquids separation systems and processes. Further aspects of the invention can be considered as providing operational flexibility between, for example, biological unit operations from filtration unit operations of a treatment facility. Still further aspects of the invention can be considered as further reducing an overall amount of solids discharged as a consequence of treating water.

Alternative aspects of the invention may be regarded as biologically treating water to promote degradation or conversion of biodegradable material, followed by settling and/or decanting the mixed liquor comprising the converted material; and in further aspects, as filtration of a solids-lean liquor to produce permeate that can be regarded as treated water. Such aspects of the invention can be contrasted to conventional membrane bioreactor systems (MBR), which seek to avoid the settling and decanting stages by substituting therefor a membrane filtration system downstream of a first anaerobic stage that is typically followed by an anoxic stage and, in some cases, an aerobic stage. In further contrast to MBR systems, which involves and promotes biological reactions within and during the filtration operation, some aspects of the invention pertain to filtering a low solids-content water, having essentially no biological activity occurring therein.

Mixed liquor having suspended solids can be recycled from the membrane filtration stage to the aerobic stage, a portion of the liquor from the second aerobic stage is typically introduced into the anoxic stage, and a portion of the liquor in the anoxic stage is introduced with the water to be treated into anaerobic stage.

The systems and components of the invention may also provide cost advantages relative to MBR systems by facilitating the use of lower cost membranes. For example, a larger pore size or more open weave membrane may be utilized rather than costlier, smaller pore size membranes. The membranes can, for example, comprise polyethylene, polypropylene, polysulfone, polyamide, polyvinylidene fluoride, and in some cases, copolymers, mixtures, and blends thereof.

Lower operating costs, relative to MBR systems, may also be realized because less energy would be required to aerate and/or transfer, as in a recycle stream, because the liquid to be filtered has a relatively lower solids concentration which typically has a lower viscosity. Indeed, advantageous aspects of the invention can be directed to filtering liquor that has less than 5 wt % solids suspended therein. The low solids liquor to be filtered can thus be characterized as having a lower viscosity relative to suspended solids mixed liquor, commonly referred to as MLSS. For example, some aspects of the invention inventively filter clarified water or liquor, having a viscosity that is within 10% of the viscosity of clean water, rather than MLSS that is characterized by having a higher viscosity. The lower viscosity approach associated with the systems and techniques of present treatment system, in turn, provides reduced costs as a result of a lower aeration burden and lower pumping loads, compared to conventional MBR systems. Increased reliability can also be realized because filtering a lower solids-content water stream, relative to conventional MBR liquor, potentially reduces the amount of undesirable biofilm and solids accumulation. Indeed, lower solids accumulation or membrane coating rates further reduces operational cleaning requirements, leading to further cost benefits.

Particularly advantageous embodiments of the invention can involve a water or wastewater treatment system comprising a biological treatment train fluidly connected to a source of water or wastewater to be treated containing undesirable biodegradable material. The biological treatment train typically comprises a bioreactor having a biomass that metabolically converts biodegradable material by, for example, nitrification and de-nitrification metabolic pathways, to less objectionable solids and water. The treatment system can comprise a solids-removal train that separates solids from liquids of a solids-lean stream or body of water treated in the biological conversion train. Further, the treatment system can comprise a solids-reducing train that reduces an amount of collected solids generated or treated during bacterial conversion of the biodegradable material in the biological treatment train. Operationally favorable treatment systems can also comprise one or more solids-collecting trains that separate solids from any of the solids-reducing train, the solids-removal train, and the biological treatment train.

FIG. 1 exemplarily illustrates an embodiment in accordance with some aspects of the invention. The treatment system 10 can be fluidly connected to a source 102 of water to be treated. In accordance with any one of the aforementioned aspects of the invention, treatment system 10 can comprise one or more biological treatment or conversion trains 110 and, optionally, one or more solids-removal systems or trains 120, typically fluidly connected to one or more unit operations of biological treatment train 110. Treatment system 10 can further comprise one or more solids-reducing systems or trains 130, which are connected or at least connectable to one or more unit operations of any of the biological train 110 and solids-removal train 120. In some embodiments, treatment system 10 can further comprise one or more solids-collecting systems or trains 140, fluidly connected or connectable downstream of one or more unit operations of any of biological treatment train 110, solids-removal train 120, and solids-reducing train 130. Treated water can be retrieved from solids-removal train 120 and delivered to storage or a point of use 104 such as a secondary use involving irrigation, or discharged to the environment.

Source 102 of water to be treated can be any of a water collection system from any one or more of a municipality, a residential community, and an industrial or a commercial facility, and an upstream pre-treatment system, or combinations thereof. For example, source 102 can be sedimentation or settling tank receiving water from a sewer system.

Biological treatment train 110 can be any combination of continuous and batch biological processes. Thus, in accordance with some aspects, biological treatment train 110 can comprise at least one bioreactor that contains or is configured to contain a biomass of microorganisms that metabolize biodegradable materials in the water to be treated. Biological treatment train 110 can comprise a series of zones each of which can be configured to provide any one or more of aerobic, anaerobic, and anoxic conditions to preferentially promote corresponding bacterial metabolic activity. For example, biological treatment train 110 can serially comprise a first zone typically disposed to receive water to be treated and configured to promote anaerobic bacterial activity therein; a second zone that promotes anoxic bacterial activity; a third zone that preferentially favors aerobic bacterial activity; and a gravity separator or settling zone from which treated effluent is decanted and settled sludge is returned to an upstream zone. Further, the biological treatment train can comprise fixed film systems such as trickling filters and biological contactors.

Other advantageous embodiments may involve biological treatment trains that utilize batch treatment processes having at least two stages performed in a single reactor or basin. Thus, in accordance with some aspects of the invention, treatment train 110 can comprise one or more sequencing batch reactors (SBR) 112 optionally operatively coupled to and regulated by at least one controller or control system 114.

Figure 2:
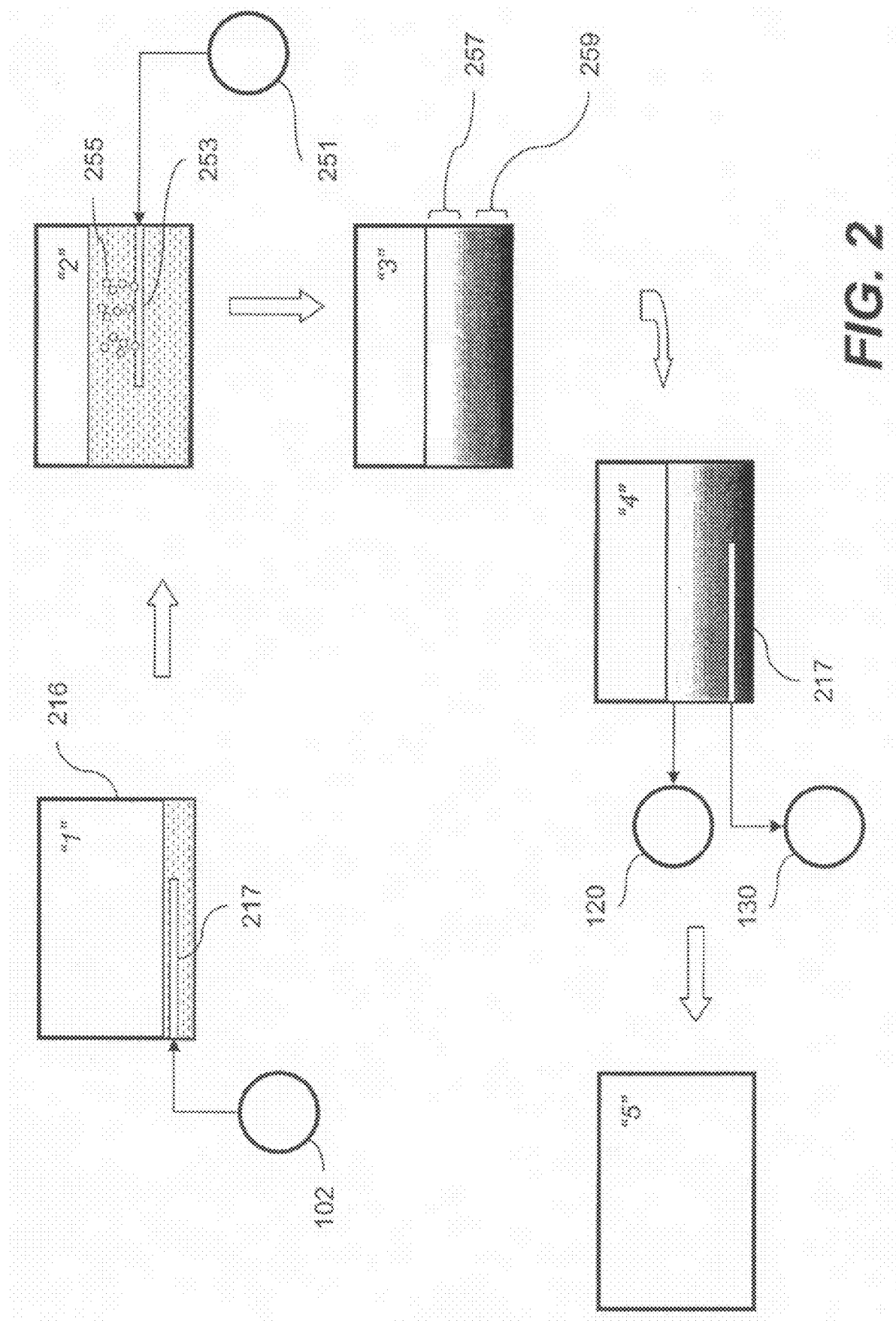
FIG. 2 is a block flow diagram illustrating a representative sequence of stages of a sequencing batch reactor pertinent to one or more aspects of the invention.

As exemplarily illustrated in FIG. 2, SBR 112 can be operated or configured to receive the water to be treated from source 102 in a first stage (illustrated as stage "1"), which is typically referred to as a FILL stage. Fill stage "1" can be performed in aerated, anoxic or a combination of aerated and anoxic conditions. Preferably, the influent water to be treated is introduced into the basin 216 of batch reactor 112 through one or more influent distribution manifolds 217. Basin 216 can be sized to accommodate or provide a desired hydraulic retention time and to accommodate the volume and incoming flow rate of water to be treated.

When basin 216 is at least partially filled or thereafter, SBR 112 can be operated to favor bacterial metabolism that converts or digest biodegradable material in a second stage (illustrated as stage "2"), which is typically referred to as a REACT stage. React stage "2" can be performed under aerobic conditions by introducing oxygen, preferably as air from one or more air sources 151 through aeration manifold 253 submerged in the liquor. React stage "2" can be performed for a period sufficient to promote at least partial biodegradation of the material. For example, aeration can be performed to create aerobic conditions to facilitate oxidation of ammonia to nitrite by ammonia-oxidizing bacteria. Air source 151 preferably further provides air released through aeration manifold 253 as air bubbles 255 in amounts sufficient to induce mixing of the liquor within basin 216. Alternatively, or in conjunction with the aeration induced phenomena, mixing can also be effected by a mixer, such as an impeller (not shown), which may be advantageous when mixing is desired without introducing air into the liquor.

A SETTLE stage (illustrated as stage "3") typically follows the aeration and/or mixing stage to create quiescent conditions that allow biomass in the liquor to settle to form a supernatant, solids-lean liquor layer 257 above a solids-rich or sludge layer 259. The duration of settle stage "3" may vary and depend on several factors including, but not limited to, the temperature of the mixed liquor and the nature and composition of the biomass.

The solids-lean liquor can then be withdrawn or decanted in a DECANT stage (illustrated as stage "4") and be further treated in, for example, solids removal train 120. At least a portion of the settled sludge 259 can be withdrawn through manifold 217 and directed to further treatment by disinfection or be discharged into the environment, such as a river. A solids-rich stream can be withdrawn and introduced into solids-reducing train 130. Withdrawal or decanting of the treated effluent or solids-lean liquor 257 can preferably be performed utilizing a floating solids-excluding decanter or skimmer (not shown) that is preferably constructed to have apertures that do not or at least reduces the likelihood of turbulent conditions that disturb the settled solids-rich layer.

An IDLE stage (illustrated as stage "5") may be optionally included during instances the SBR 112 waits to receive influent to be treated.

In some cases, any of the functions or activities can be performed in more than one stage. For example, withdrawing a solids-rich sludge can be performed during settling stage "3" as well as during idle stage "5". Thus, the invention can be practiced in other than the sequence of stages presented herein. Further, any or more stages can be omitted or combined. For example, in some cases, react stage "2" can be performed during fill stage "1" thereby combining or extending the duration of the react stage.

Preferably, some aspects of the invention can advantageously promote bacterial activity to effect nitrification and de-nitrification. The biomass in any one of the stages typically comprises a mixture of bacteria. Further, each of the stages may have a different biomass constituency. Thus, for example, the biomass during or after react stage "2" may comprise obligate aerobes, facultative aerobes, and aerotolerant microorganisms. The nitrification and de-nitrification process can be facilitated by microorganisms of the genera *Nitrosomonas* and *Nitrobacter*.

The OMNIFLOW® sequencing batch reactor system from Siemens Water Technologies Corp., Edwardsville, Kans., is an example of a commercially available treatment system that can comprise the biological train used to effect biological nutrient removal in accordance with some aspects of the invention. Further aspects of the invention may utilize the systems and methods disclosed by any of Calltharp and Calltharp et al. in U.S. Pat. Nos. 4,775,467, 5,021,161, and 6,884,354, each of which is incorporated herein by reference. Indeed, some advantageous features pertaining to constant level SBR systems may be utilized. Such constant level biological conversion systems may advantageously provide even further improved process control of the overall treatment system by reducing any operational fluctuations or variations during downstream filtration operations. Further advantages can, in some cases, reduce the size any equalization tanks, or even eliminate the need for such unit operations, which reduces the overall treatment system footprint and capital requirements.

Sequencing the various stages may be facilitated by utilizing one or more controllers 114 operatively coupled to the one or more sequencing batch reactors 112. One or more sensors are typically utilized in or with the one or more unit operations of SBR 112 to provide an indication or characteristic of the state or condition of processes during biological treatment processes. For example, one or more level indicators (not shown) can be disposed in basin 216 and configured to transmit to the one or more controllers 114 a representation of the liquid level contained within basin 216. Controller 114 can, based on the signals received from the one or more sensors, generate and send control signals to any of the components or even ancillary systems of train 110. For example, at a high liquid level condition in basin 216, as measured by the one or more level indicators, controller 114 can generate and transmit a control signal to an actuator that closes an inlet valve fluidly isolating source 102 and basin 216. Controller 114 typically further generates the control signals that initiates and terminates the stages of one or more SBRs 112. For example, controller 114 can generate and transmit a control signal to energize or de-energize air source 251.

Figure 3:
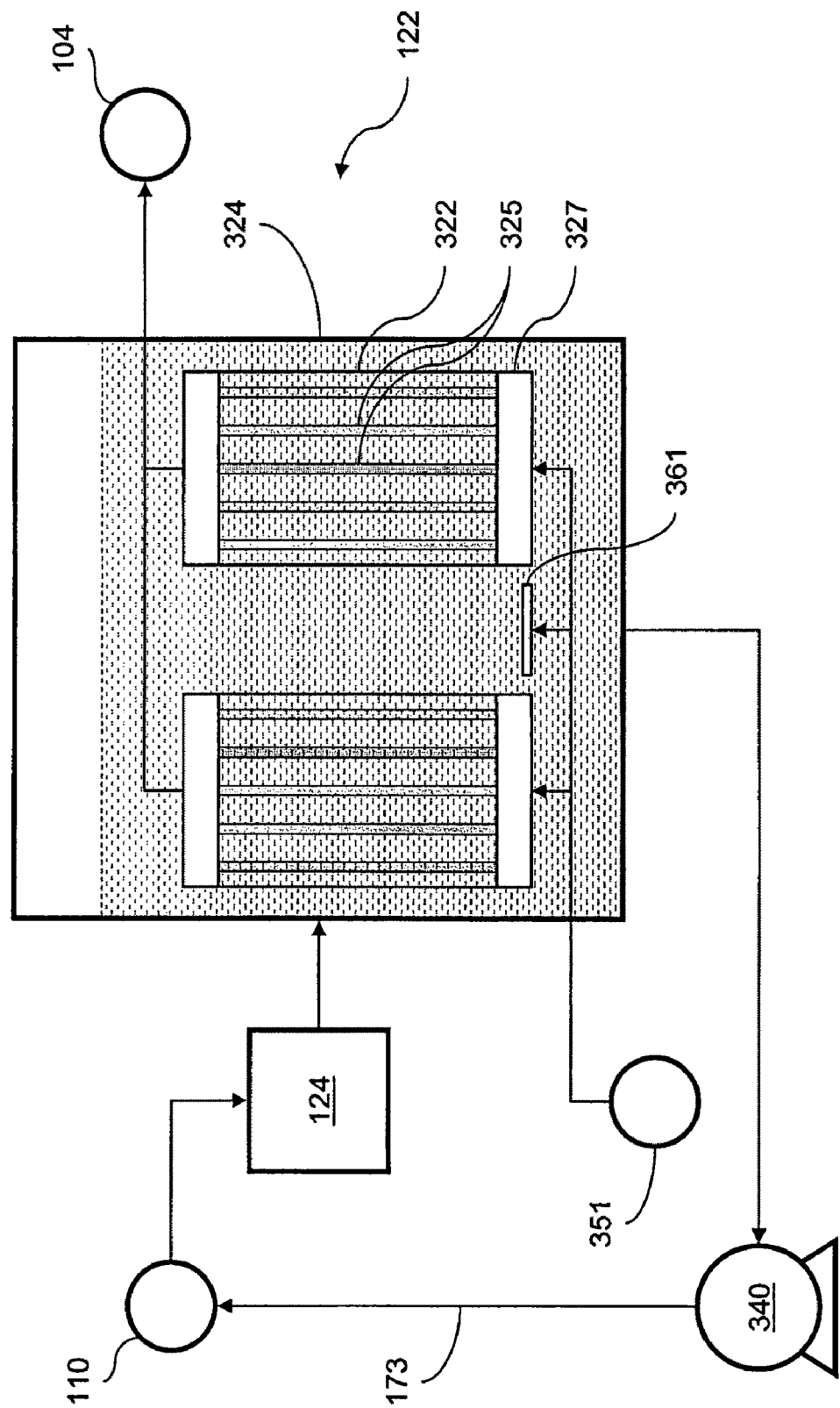
FIG. 3 is a block flow diagram illustrating a representative membrane filtration system pertinent to one or more aspects of the invention.

Solids-lean liquor decanted from basin 216 can be further treated in solids-removal train 120 and, in some cases, selectively retains undesirable microorganism such as those of the genera *Cryptosporidium* and *Giardia* or otherwise reduce the concentration of pathogenic species in the treated permeate. As shown in FIG. 3, train 120 preferably comprises at least one membrane filtration system 122 having one or more membrane cassettes or modules 322, typically at least partially immersed in the liquid to be filtered contained in a vessel 324 of filtration system 122. Module 322 typically comprises a plurality of membranes 325 having a microporous structure which selectively inhibits any solids and allows water to permeate therethrough. Permeate or treated water having desirable characteristics can be withdrawn from membrane module 322 and at least a portion thereof delivered to storage or secondary use 104 or discharged to the environment. For example, treated water can be used to irrigate vegetation. In some cases, however, the treated water can be further purified or treated in one or more downstream unit operations such as, but not limited to, evaporative systems, electrodeionization systems, disinfection systems such as those that irradiate with ultraviolet radiation or raise the temperature of the stream to inactivate any contaminants, and pressure-driven processes like those utilizing reverse osmosis, nanofiltration, and ultrafiltration.

A pressure differential from the unfiltered liquor side to the permeate side of the membrane effects the filtration. This transmembrane pressure differential can be effected by applying a higher pressure against the liquor, relative the permeate pressure, and/or by applying vacuum pressure at the permeate side of the membrane while providing atmospheric pressure over the liquor or retentate side.

Typically each module has horizontally or vertically oriented membrane fibers, each having millions of microscopic pores. Water or liquor having low-solids concentration to be removed is filtered by applying a slight vacuum to one or more ends of each of the membrane fibers, thereby drawing the water as permeated through the microscopic pores and across the membrane walls and into an internal fiber cavity. The micropores typically inhibit unwanted solids such as bacteria, viruses, fecal coliforms, and other pathogens, from passing through but allowing water to pass.

Feed water flows into the membrane tank and treated water is drawn through the membranes by applying a vacuum to the inside of the membrane fibers. In some cases, the permeate water retrieved by filtration can be replaced with water to be filtered, typically from an equalization tank, to maintain a constant liquor level.

Train 120 can optionally comprise one or more surge vessels to de-couple the biological treatment operations from the filtration operations. For example, one or more equalization tanks 124 can be fluidly connected downstream of basin 216 and upstream of membrane filtration system 122. Tank 124 can thus receive solids-lean liquor during the settle or idle stages. Liquor can thus be introduced into the filtration system 122 continuously or continually, rather than intermittently. Such a configuration can advantageously reduce the flux requirement of filtration system 122, relative to a capacity requirement that would have been dictated by intermittent processing.

Normal filtration operations typically occur from an outer surface to a hollow inner core or lumen of the membrane fibers. Filtered water typically passes through the walls of the fibers while particulates are retained on the outside of the fiber wall; particulates larger than about 0.1 microns are typically retained or filtered.

In some embodiments of the invention, membrane cassettes or modules 322 can be cleaned in place to dislodge any solids accumulated at the surface of membrane as a result of the filtration process. Cleaning can be performed by introducing a scouring fluid of air, liquid, or a mixture of air and liquid against the plurality of membranes 325 for a duration and at conditions sufficient remove the accumulated solids. For example, air from air source 351 or from source 251 can be directed through a potting head 327 of module 322 to membranes 325. Air or a mixture of air and water can be utilized through one or more nozzles 361 to aerate and/or mix liquor in vessel 324 to, for example, prevent or at least reduce the likelihood of concentration polarization during the filtration process. Backwashing may also be utilized to facilitate or effect cleaning, typically automatically after a predetermined time or filtration duration, such as after from about 15 minutes up to sixty minutes of filtration. The backwash cycle interval and duration period may be dependent on liquor conditions and a particular facility may require longer backwashing period or more frequent backwashing operations because of a higher suspended solids concentration. During backwashing, liquor and air can be used to scour the outer membrane surface. Optionally, vessel 324 is at least partially drained after backwashing and before normal filtration operations recommence.

Cleaning can also involve periodic chemical cleaning that at least partially dissolves or detaches any accumulated particles on the membrane surface. Chemical cleaning may be advantageously utilized where backwashing cannot sufficiently dislodge particles. For example, the membrane surface can be exposed to a solution with one or more oxidizers such as chlorine. Acids can also remove or facilitate removal of stubborn inorganic compounds. After the chemical cleaning process, a backwash is typically utilized to remove chemical cleaning solutions before recommencing normal filtration operations.

A membrane integrity test can be periodically performed to ensure reliable removal of the harmful or undesirable microorganisms or pathogens. For example, an air hold test can be performed wherein compressed air is held at about 96 kPa to detect any leaks.

A portion of the retentate liquor contained in vessel 324 can be withdrawn continuously, continually, or intermittently, by, for example, one or more pumps 340 and transferred to train 110 through recycle line 173. Typically, retentate is introduced with water to be treated from source 102 into the one or more bioreactors 112.

Other unit operations may utilized, in place of or along with filtration system 122 to effect solid and liquid phase separation. For example, one or more clarifiers, nanofiltration, and ultrafiltration may be utilized.

One or more controllers can be utilized to direct or regulate the filtration processes. For example, a dedicated controller or controller 114 can be configured to generate a control signal to energize or de-energize air source 351 thereby managing at least one of the rate, duration, and frequency of scouring of any of the membrane modules. The controller can also be configured to manage or regulate a rate of flow of the retentate recycle into train 110 by energizing or de-energizing a motor (not shown) of pump 340 or by actuating a flow control valve (not shown) in recycle line 173.

Commercially available filtration systems that may be utilized in some embodiments of the invention to serve as barriers to remove *Cryptosporidium*, *Giardia*, bacteria, turbidity, and suspended solids, include those employing the CMF-S™ continuous membrane filtration modules as well as the MEMCOR® CMF (Pressurized) XP, CP, and XS membrane filtration systems, from Siemens Water Technologies Corp., Windsor, Australia.

Figure 4:
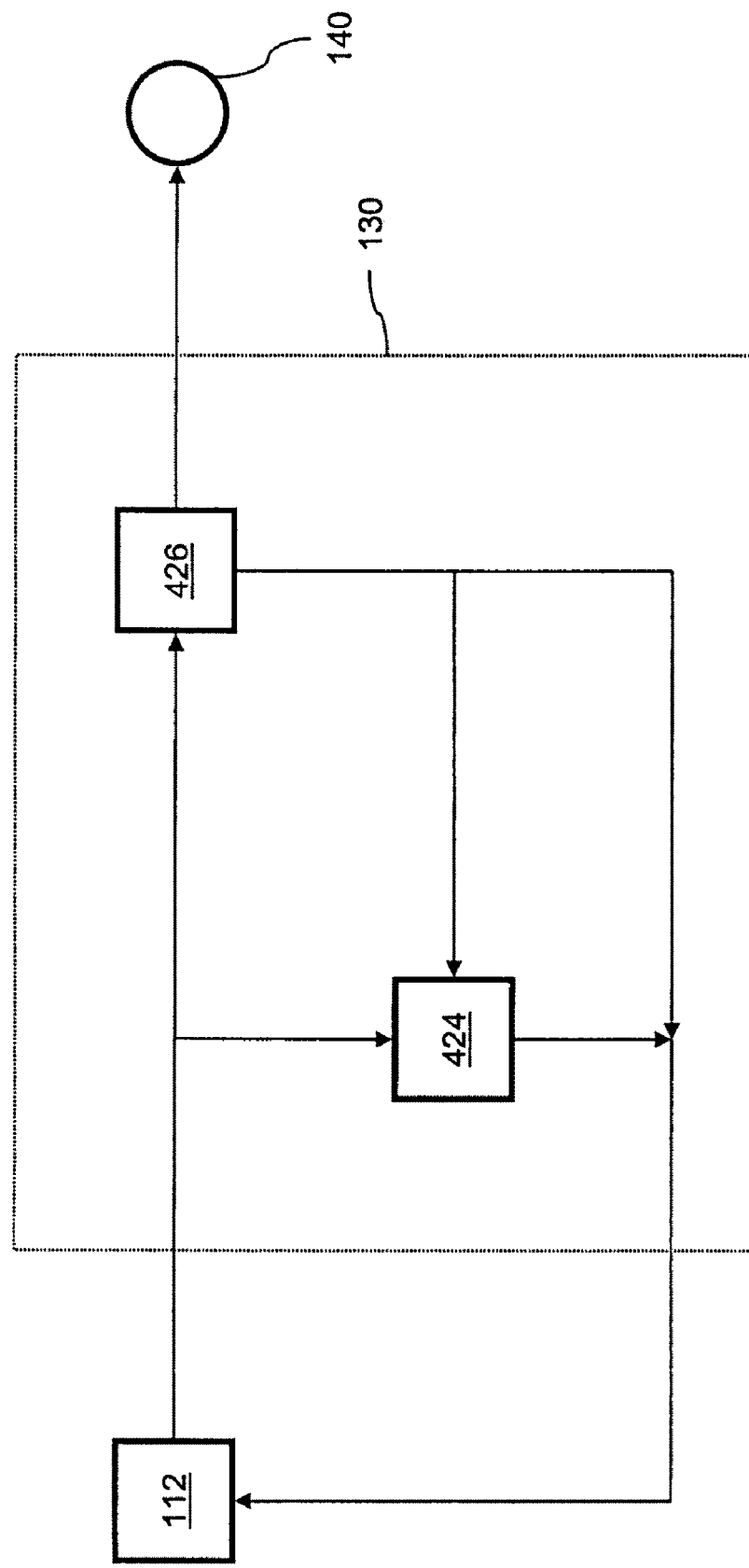
FIG. 4 is a block flow diagram illustrating a representative solids-reducing system pertinent to one or more aspects of the invention.

Sludge or solids-rich layer from basin 216 can be further treated in one or more solids reduction or solids-reducing trains 130. Train 130 can comprise one or more unit operations that reduce the amount of solids of the sludge. As illustrated in FIG. 4, train 130 can comprise one or more bioreactors, referred to herein as interchange bioreactor 424, each of which is typically operated to create conditions that favor the growth of facultative microorganisms over the growth of obligate microorganisms.

Interchange bioreactor 424 or facultative biological reactor can comprise biomass with a bacterial population distribution that is dominated by facultative aerobes, which can digest at least a portion of the biodegradable solids of the sludge. An interchange of biological solids decomposition and re-growth is thus created that reduces the overall amount of biological solids. The resultant sludge from interchange bioreactor 424 typically has less solids content, relative to the solids content of the sludge from train 110 because the facultative microorganisms metabolize or digest the remains of inactivated obligate aerobes and their byproducts and, in some cases, other biodegradable material.

Interchange bioreactor 424 is typically operated with conditions that inactivate at least a portion of the obligate aerobes by, for example, controlling or reducing the dissolved oxygen content of the biomass contained therein which, in some cases, can involve providing varying periods of alternating aerobic and anoxic conditions by, for example, controllably regulating air introduced thereto from, for example, an air source (not shown). For example, the operating steps of interchange bioreactor 424 can include sludge filling, accompanied or unaccompanied by mixing, aerating, decanting, and settling phases. Any one of the phases may last from, for example, one to four hours. Moreover, aerating may be performed to achieve a desired oxygen content or oxidation reduction potential. The overall process typically provides alternating environments of oxygen-rich and oxygen-deficient conditions. Interchange bioreactor 424 or any component or subsystem of solids-reducing train 130 can be operated in accordance with any one or more of the techniques disclosed by Miklos in U.S. Pat. Nos. 6,660,163, 6,833,074, and 7,105,091, each of which is incorporated herein by reference.

Any portion of the resultant sludge can be reintroduced into any of the unit operations of biological treatment train 110 (such as into SBR 112) for further degradation, or to solids-collection train 140.

Alternatively advantageous embodiments may involve configurations that utilize one or more inert solids separators 426 that remove any trash, grit, and other non-biodegradable solid materials. For example, inert solids from a sludge stream from SBR 112 can be directed to separator 426 and biomass can then be directed to interchange bioreactor 424. Non-limiting examples of unit operation that can be used to separate the inert solids include hydrocyclones, screens, and strainers. Inert solids retrieved from separator 426 can be directed to solids-collection train 140 or directly discharged into a landfill. Thus, any portion of a sludge or solids-rich liquor having a biomass that is predominantly obligate aerobes withdrawn from SBR 112, typically after the settle stage, can be introduced into interchange bioreactor 424, with or without further solids-liquids separation in inert solids separator 426.

The CANNIBAL™ solids reduction process, from Siemens Water Technologies Corp., Waukesha, Wis., is an example of a commercially available system and process that may be utilized in accordance with some aspects of the present invention.

A controller may be utilized to regulate the operating parameters of any unit operation of train 130. For example, a controller, which can be controller 114, can be configured to generate and transmit a process control signal that activates or inactivates an air source and further regulates a rate, duration and frequency of air delivered to interchange bioreactor 424. Indeed, advantageous embodiments in accordance with some aspects of the invention can involve measuring one or more process conditions of interchange bioreactor 424 and generating one or more control signals based at least partially on the one or more measured process conditions. For example, one or more both of the dissolved oxygen and the oxidation reduction potential of the liquor in interchange reactor 424 can be measured and transmitted to controller 114, which can then generate and transmit a control signal to one or more air sources or systems to achieve a target or desired value in the liquor of the interchange reactor 424. The aforementioned control loop can be nested within or applied in conjunction with a control schedule that is configured to provide the desired microorganism population distribution.

Solids-collecting train 140 can comprise one or more polishing or dewatering unit operations, thickeners, or solids-liquid separators 128 such as hydrocyclones, clarifiers, drying beds, and lagoons which can further increase the solids concentration or remove water from solids to be discharged or disposed to, for example, a landfill 150. In some embodiments, one or more membrane filter modules may be used to separate the solid phase from the liquid phase of the sludge from system 10.

Other unit operations such as filters and strainers may also be utilized in train 140. The precipitated or collected solids can be disposed as sludge. Further, a controller can facilitate or regulate the operating parameters of train 140. Thus, for example, controller 114 may be configured to adjust a rate of addition of the one or more treating agents.

Controller 114 may respond to signals from timers (not shown) and or sensors (not shown) positioned at any particular location within treatment system 10. For example, a sensor positioned in interchange bioreactor 424 may indicate less than optimum conditions therein. The one or more sensors may monitor one or more operational parameters such as pressure, temperature, one or more characteristics of the liquor, and/or one or more characteristics of the effluent. Similarly, a sensor (not shown) disposed in or otherwise positioned with recycle 173 to indicate a flow rate thereof at, below, or above a desired or target rate. Controller 114 may then respond by generating a control signal causing an increase or decrease in the recycle flow rate. The target recycle flow rate may be a dependent on an operating parameter of the treatment system. For example, the target recycle flow rate may be a multiple of, e.g., at least two times, the influent flow rate of the incoming water to be treated.

The system and controller of one or more embodiments of the invention provide a versatile unit having multiple modes of operation, which can respond to multiple inputs to increase the efficiency of the wastewater treatment system.

The controller may be implemented using one or more computer systems which may be, for example, a general-purpose computer such as those based on in Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system 10. For example, the memory may be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of system 10 and/or components thereof. Alternatively, the sensors, the metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 114 can be performed in separate computers, which in turn, can be communication through one or more networks.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, an existing treatment facility may be modified to utilize or incorporate any one or more aspects of the invention. Accordingly, the foregoing description and drawings are by way of example only. Further, the depictions in the drawings do not limit the inventions to the particularly illustrated representations. For example, one or more horizontally oriented filter membranes may be utilized in one or more filtration unit operations of the treatment system.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed:

1. A method of treating wastewater comprising:
   introducing wastewater to be treated into a biological reactor;
   aerating at least a portion of the wastewater to promote conversion of at least a portion of undesirable components in the wastewater into a first biomass in the biological reactor;
   allowing at least a portion of the first biomass to settle in the biological reactor thereby producing a solids-rich liquor and a solids-lean liquor;
   transferring at least a portion of the solids-lean liquor into a membrane filtration system; and
   transferring at least a portion of the solids-rich liquor into a biological solids reduction system.

2. The method of claim 1, further comprising retaining at least a portion of the solids-lean liquor in an equalization tank prior to transferring into the membrane filtration system.

3. The method of claim 2, further comprising introducing a portion of retained solids-lean liquor from the membrane filtration system into the biological reactor.

4. The method of claim 3, further comprising withdrawing treated water through the membrane filtration system.

5. A method of facilitating wastewater treatment comprising:
   providing a membrane filtration system comprising a retentate liquor outlet;
   fluidly connecting the membrane filtration system downstream of a sequencing batch reactor system;

fluidly connecting the retentate liquor outlet of the membrane filtration system to an inlet of the sequencing batch reactor system; and connecting a solids-reducing biological system to a sludge outlet of the sequencing batch reactor system.

6. The method of claim 5, wherein fluidly connecting the membrane filtration system comprises fluidly connecting the sequencing batch reactor system upstream of an equalization tank and fluidly connecting the membrane filtration system downstream of the equalization tank.

7. The method of claim 5, further comprising connecting a retentate outlet from the solids-reducing bioreactor system to an inlet of the sequencing batch reactor system.

8. The method of claim 7, further comprising fluidly connecting a solids separator unit downstream of at least one of the solids-reducing biological system and the membrane filtration system.

9. A method of treating water comprising:
    filling a basin of a sequencing batch reactor with water to be treated to form mixed liquor;
    aerating the mixed liquor in the basin to promote biological activity therein;
    decanting from the basin a solids-lean water formed after allowing at least a portion of the solids to settle into a solids-rich sludge;
    transferring at least a portion of the solids-rich sludge into a bioreactor; and
    converting a microorganism population distribution of the solids-rich sludge into a facultative-organism dominant population distribution.

10. The method of claim 9, further comprising
    contacting at least a portion of the decanted solids-lean water to a membrane filtration system.

11. The method of claim 10, further comprising withdrawing permeate water from the membrane filtration system.

12. A method of treating water comprising:
    filling a basin of a sequencing batch reactor with water to be treated to form mixed liquor;
    aerating the mixed liquor in the basin to promote biological activity therein;
    allowing at least a portion of the solids in the mixed liquor to settle into a solids-rich sludge below a solids-lean water layer;
    decanting at least a portion of the solids-lean water;
    contacting the decanted solids-lean water to a membrane filtration system; and
    promoting growth of facultative microorganisms over obligate aerobic microorganisms in at least a portion of the solids-rich sludge.

13. The method of claim 12, wherein promoting growth of facultative microorganisms comprises:
    introducing the at least a portion of the solids-rich sludge into an interchange bioreactor; and
    regulating air introduced onto the interchange bioreactor.

* * * * *